(12) United States Patent
Goto et al.

(10) Patent No.: US 8,736,489 B2
(45) Date of Patent: May 27, 2014

(54) GNSS RECEIVER

(75) Inventors: Yoji Goto, Nishinomiya (JP); Katsuo Yamada, Nishinomiya (JP); Naomi Fujisawa, Nishinomiya (JP); Hiraku Nakamura, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 278 days.

(21) Appl. No.: 13/375,665

(22) PCT Filed: May 27, 2010

(86) PCT No.: PCT/JP2010/058982
§ 371 (c)(1),
(2), (4) Date: Dec. 1, 2011

(87) PCT Pub. No.: WO2010/140528
PCT Pub. Date: Dec. 9, 2010

(65) Prior Publication Data
US 2012/0068885 A1    Mar. 22, 2012

(30) Foreign Application Priority Data
Jun. 2, 2009 (JP) ................................. 2009-132989

(51) Int. Cl.
*G01S 19/32* (2010.01)
(52) U.S. Cl.
USPC .................................................. 342/357.72
(58) Field of Classification Search
USPC .................................................. 342/357.72
See application file for complete search history.

(56) References Cited

U.S. PATENT DOCUMENTS

2008/0228398 A1*  9/2008  Syrjarinne et al. ............ 701/213

FOREIGN PATENT DOCUMENTS

| JP | 2002-71779 A | 3/2002 |
| JP | 2005-265476 A | 9/2005 |
| JP | 2007-187592 A | 7/2007 |
| JP | 2008-51567 A | 3/2008 |

OTHER PUBLICATIONS

PCT/ISA/210—International Search Report dated Jun. 22, 2010 for PCT/JP2010/058982.

* cited by examiner

*Primary Examiner* — Harry Liu
(74) *Attorney, Agent, or Firm* — Birch, Stewart, Kolasch & Birch, LLP.

(57) ABSTRACT

To provide an art that can improve a performance of a GNSS receiver. A GNSS receiver 100 includes a receiver 1, a navigation message acquiring unit 3, a navigation message processor 5, and a calculator 6. The receiver 1 receives signals from satellites. The navigation message acquiring unit 3 acquires predetermined information in navigation messages contained in the signals received by the receiver. The navigation message processor 5 outputs either one of the same kind of information in the plural different kinds of navigation messages, which is acquired by the navigation message acquiring unit 3. The calculator 6 performs a calculation based on the information outputted from the navigation message processor 5.

9 Claims, 9 Drawing Sheets

GNSS RECEIVER

TECHNICAL FIELD

The present invention relates to a GNSS receiver for receiving signals from satellites of GNSS (Global Navigation Satellite System), such as GPS (Global Positioning System), GALILEO, GLONASS (Global Navigation Satellite System).

BACKGROUND ART

Conventionally, various kinds of arts regarding to a GNSS receiver are devised. For example, in Patent Document 1, an art of, in a GNSS receiver, obtaining an ionospheric delay amount based on a plurality of wireless signals with frequencies different from each other, which are transmitted from the same satellite, is disclosed. Further, in Patent Document 2, an art of obtaining a pseudorange from which influence of an ionospheric delay is removed by using a method, so called an ionospheric free linear combination, is disclosed.

REFERENCE DOCUMENT(S) OF CONVENTIONAL ART

Patent Documents

Patent Document 1: JP2007-187592A
Patent Document 2: JP2008-051567A

DISCLOSURE OF THE INVENTION

Problem(s) to be Solved by the Invention

Meanwhile, generally, an improvement in performance of a GNSS receiver is desired.

Therefore, the present invention is made in view of the above points and has an object to provide an art that can improve a performance of a GNSS receiver.

Means for Solving the Problems

To solve the problem, a GNSS receiver relating to the invention receives at least two kinds of signals transmitted from a GNSS satellite, the signals each containing a navigation message which is different from the other message and superimposed on the other message. The GNSS receiver includes a receiver for receiving the signals, a navigation message acquiring unit for acquiring predetermined information in the navigation messages contained in the received signals, a navigation message processor for outputting either one of the same kind of information contained in the different navigation messages, which is acquired by the navigation message acquiring unit, and a calculator for performing a calculation based on the outputted information.

Further, according to one aspect of the GNSS receiver relating to the invention, among the same kind of information, the navigation message processor may output either one of the information acquired first, the latest information, the most accurate information, and the most reliable information.

Further, according to the aspect of the GNSS receiver relating to the invention, the navigation message processor may output the information contained in the navigation message based on, among the same kind of information, the latest information, the most accurate information, and the most reliable information.

Further, according to the aspect of the GNSS receiver relating to the invention, the navigation message processor may output, among the same kind of information, information designated by a user.

Further, according to one aspect of the GNSS receiver relating to the invention, the different navigation messages may be a NAV message and a CNAV message, and the navigation message processor may output, among the same kind of information, information contained in the CNAV message.

Further, according to one aspect of the GNSS receiver relating to the invention, the same kind of information may be either one of an ephemeris, an almanac, an ionospheric parameter, and a UTC parameter.

Moreover, a GNSS receiver relating to the invention receives at least two kinds of signals transmitted from a GNSS satellite, the signals each containing a navigation message which is different from the other message and superimposed on the other message. The GNSS receiver includes a receiver for receiving the signals, a navigation message acquiring unit for acquiring predetermined information in the navigation messages contained in the received signals, a navigation message processor for outputting, in a case where, in a navigation message different from another navigation message in which the predetermined information acquired by the navigation message acquiring unit is contained, the same kind of information as the predetermined information is not acquired by the navigation message acquiring unit, the predetermined information acquired by the navigation message acquiring unit, a calculator for performing a calculation based on the outputted information.

Moreover, a GNSS receiver relating to the invention receives at least two kinds of signals transmitted from a GNSS satellite, the signals each containing a navigation message which is different from the other message and superimposed on the other message. The GNSS receiver includes a receiver for receiving the signals, a navigation message acquiring unit for acquiring predetermined information in the navigation messages contained in the received signals, a navigation message processor for outputting, in a case where the receiver only receives a single kind of signal, the predetermined information acquired by the navigation message acquiring unit, and a calculator for performing a calculation based on the outputted information.

Effect of the Invention

According to the invention, the navigation message processor outputs either one of the same kind of information contained in the different navigation messages, which is acquired by the navigation message acquiring unit, and the calculator performs the calculation based on the outputted information, thereby, a calculation based on appropriate information between the same kind of information can be performed. Therefore, the performance of the GNSS receiver relating to the invention improves.

Further, according to the invention, in the case where, in the navigation message different from the other navigation message in which the predetermined information acquired by the navigation message acquiring unit is contained, the same kind of information as the predetermined information is not acquired by the navigation message acquiring unit, the calculator performs the calculation based on the predetermined information acquired by the navigation message acquiring unit, thereby, regardless of the kind of the navigation message within which the predetermined information acquired by the navigation message acquiring unit is contained, the calculator can perform the calculation based on the predetermined information. Therefore, the calculation result in the calculator can promptly be obtained, and the performance of the GNSS receiver relating to the invention improves.

Moreover, according to the invention, in a case where the receiver only receives a single kind of signals, the calculator performs the calculation based on the predetermined information contained in the single kind of signals acquired by the navigation message acquiring unit, thereby, regardless of the kind of the navigation message within which the predetermined information acquired by the navigation message acquiring unit is contained, the calculator can perform the calculation based on the predetermined information. Therefore, the calculation result in the calculator can promptly be obtained, and the performance of the GNSS receiver relating to the invention improves.

MODES OF CARRYING OUT THE INVENTION

Basic Configuration

Figure 1:
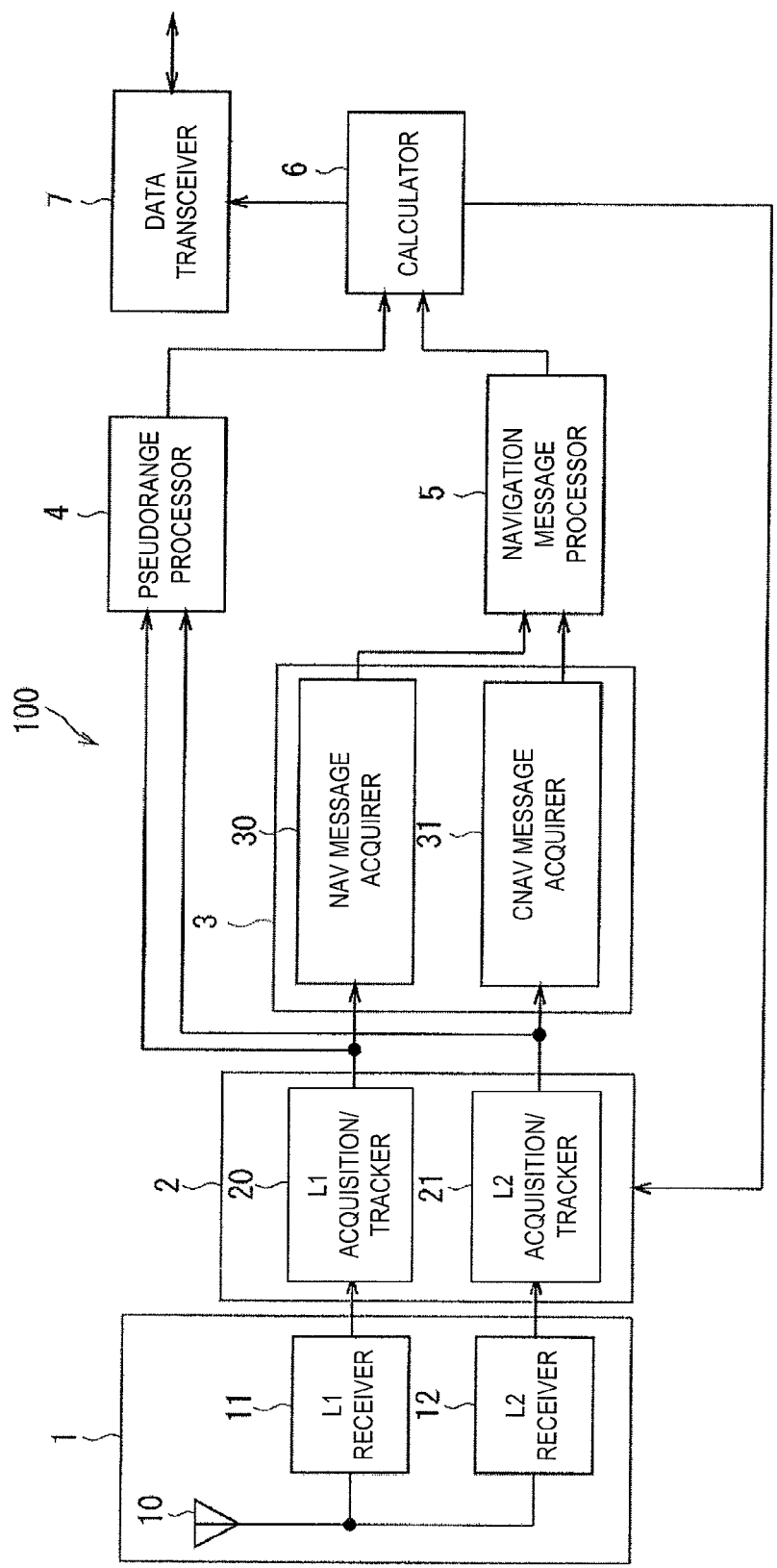
FIG. 1 is a block diagram showing a configuration of a GNSS receiver according to an embodiment of the invention.

FIG. 1 is a block diagram showing a configuration of a GNSS receiver 100 according to this embodiment of the present invention. The GNSS receiver 100 according to this embodiment is, for example, in GPS, a GPS receiver for receiving signals from satellites. The GNSS receiver 100 according to this embodiment obtains a position of the GNSS receiver itself and a time of the UTC (Universal Time, Coordinated) based on the reception signals from the GPS satellites, and outputs them.

As shown in FIG. 1, the GNSS receiver 100 includes a receiver 1 for receiving the transmission signals from the GPS satellites, a acquisition/tracking unit 2, a navigation message acquiring unit 3, a pseudorange processor 4, a navigation message processor 5, a calculator 6, and a data transceiver 7 for performing a data transception with an external device.

The receiver 1 includes an antenna 10, an L1 receiver 11, and an L2 receiver 12. The L1 receiver 11 performs amplification processing and down conversion on an L1C/A signal received by the antenna 10 to produce and output a baseband signal of the L1C/A signal (hereinafter, referred to as the "L1 baseband signal"). The L2 receiver 12 performs amplification processing and down conversion on an L2C signal received by the antenna 10 to produce and output a baseband signal of the L2C signal (hereinafter, referred to as the "L2 baseband signal"). Both of the L1C/A signal and the L2C signal are transmitted from each of the launched GPS satellites in the GPS.

Further, the L1C/A signal is what a PN (pseudo-noise) code called as a C/A code, and a navigation message called as the NAV message are superimposed on a carrier with an L1 frequency (1575.42 MHz).

Further, the L2C signal is formed with a first signal obtained by superimposing, on a carrier with an L2 frequency (1227.6 MHz), a PN code called as an L2CM code, and a navigation message called as a CNAV message, and a second signal obtained by superimposing, on the carrier with the L2 frequency, only a PN code called as an L2CL code. The first signal and the second signal are alternately transmitted from the GPS satellite. Hereinafter, the L2CM code and the L2CL code may collectively be referred to as the "L2C code." Further, the L1C/A signal and the L2C signal received by the receiver 1 may be referred to as the "GPS signals" as a whole.

The NAV message and the CNAV message contain the same kind of information. For example, an ephemeris indicating information on a detailed orbit of each of the GPS satellites for transmitting the navigation messages, an almanac indicating information on general orbits of all GPS satellites, an ionospheric parameter for obtaining an ionospheric delay amount, and an UTC parameter for obtaining the UCT time are contained in each of the NAV and CNAV messages. The ionospheric parameter and the UTC parameter are common information among all of the GPS satellites. Hereinafter, the ephemeris, the almanac, the ionospheric parameter, and the UTC parameter contained in the NAV message are referred to as the "NAV ephemeris", the "NAV almanac", the "NAV iosopheric parameter", and the "NAV-UTC parameter", respectively. Further, the ephemeris, the almanac, the ionospheric parameter, and the UTC parameter contained in the CNAV message are referred to as the "CNAV ephemeris", the "CNAV almanac", the "CNAV iosopheric parameter", and the "CNAV-UTC parameter", respectively.

The acquisition/tracking unit 2 includes an L1 acquisition/tracker 20 and an L2 acquisition/tracker 21. The L1 acquisition/tracker 20 acquires the L1C/A signals from the GPS satellites and then, tracks the acquired L1C/A signals. The L2 acquisition/tracker 21 acquires the L2C signals from the GPS satellites and then, tracks the acquired L2C signals.

The L1 acquisition/tracker 20 has a plurality of processing channels (e.g., eight channels), and can perform the acquisition and tracking of the L1C/A signals from the different GPS satellites in the plurality of processing channels in parallel. In each processing channel of the L1 acquisition/tracker 20, the L1 baseband signal from the L1 receiver 11 is multiplied by a carrier (hereinafter, it may be referred to as the "L1 internal carrier") produced by the L1 acquisition/tracker 20. Then, in each processing channel, the signal obtained by multiplying the L1 baseband signal with the L1 internal carrier, and an C/A code (hereinafter, it may be referred to as the "internal C/A code") of the GPS satellite as a acquisition target which is produced by the L1 acquisition/tracker 20 are multiplied, and a correlation value thereof is obtained. In each processing channel, by controlling phases of the L1 internal carrier and the internal C/A code, the phases where the correlation value reaches its peak are searched. In each processing channel, when the phases of the L1 internal carrier and the internal C/A code, where the correlation value reaches its peak, are obtained, the acquisition of the L1C/A signal from the GPS satellite as the acquisition target is completed, and then, the phases of the L1 internal carrier and the internal C/A code are controlled to keep the correlation value at the peak. Thereby, the tracking of the L1C/A signal is performed. Whereas, if the phases of the L1 internal carrier and the internal C/A code, where the correlation value reaches its peak, are not obtained and the L1C/A signal of the GPS satellite as the acquisition target cannot be acquired, the GPS satellites as the acquisition target is changed, the internal C/A code is changed to a C/A code dedicated to the GPS satellite as a changed acquisition target, and the similar processing is performed.

Further, in each processing channel of the L1 acquisition/tracker 20, a time integrated value for the phase of the carrier of the L1 baseband signal for the acquired GPS satellite, that is an ADR (Accumulated Delta Range), is obtained. Further, in each processing channel, the phase of the C/A code of the L1 baseband signal for the acquired GPS satellite is obtained, and a pseudorange between the GPS satellite and the GNSS receiver itself is obtained based on the phase. Hereinafter, the ADR and the pseudorange are collectively referred to as the "observation data." Moreover, the observation data obtained from the L1C/A signal is referred to as the "L1 observation data."

The acquisition/tracker 21 has a plurality of processing channels (e.g., eight channels), and can perform the acquisition and tracking of the L2C signals from the different GPS satellites in the plurality of processing channels in parallel. In each processing channel of the L2 acquisition/tracker 21, the L2 baseband signal from the L2 receiver 12 is multiplied by a carrier (hereinafter, it may be referred to as the "L2 internal carrier") produced by the L2 acquisition/tracker 21. Then, in each processing channel, the signal obtained by multiplying the L2 baseband signal by the L2 internal carrier and an L2C code (hereinafter, it may be referred to as the "internal L2C code") of the GPS satellite as a acquisition target which is produced by the L2 acquisition/tracker 21 are multiplied, and a correlation value thereof is obtained. In each processing channel, by controlling phases of the L2 internal carrier and the internal L2C code, the phases where the correlation value reaches its peak are searched. In each processing channel, when the phases of the L2 internal carrier and the internal L2C code, where the correlation value reaches its peak, are obtained, the acquisition of the L2C signal from the GPS satellite as the acquisition target is completed, and then, the phases of the L2 internal carrier and the internal L2C code are controlled to keep the correlation value at the peak. Thereby, the tracking of the L2C signal is performed. Whereas, if the phases of the L2 internal carrier and the internal L2C code, where the correlation value reaches its peak, are not obtained and the L2C signal of the GPS satellite as the acquisition target cannot be acquired, the GPS satellites as the acquisition target is changed, the internal L2C code is changed to an L2C code dedicated to the GPS satellite as a changed acquisition target, and the similar processing is performed.

Further, in each processing channel of the L2 acquisition/tracker 21, an ADR for the acquired GPS satellite is obtained. Further, in each processing channel, the phase of the L2C code of the L2 baseband signal for the acquired GPS satellite is obtained and a pseudorange between the GPS satellite and the GNSS receiver itself is obtained based on the phase. Hereinafter, observation data obtained from the L2C signal is referred to as the "L2 observation data."

Note that, among all the launched GPS satellites in GPS, the GPS satellite of which the transmission signal is acquired and tracked by at least one of the L1 and L2 acquisition/trackers 20 and 21 is particularly referred to as the "reception satellite."

The navigation message acquiring unit 3 includes an NAV message acquirer 30 and a CNAV message acquirer 31. The NAV message acquirer 30 acquires, for every reception satellite, the various kinds of information, such as the ephemeris contained in the NAV message, from a demodulated signal obtained by multiplying the L1 baseband signal by the L1 internal carrier and the internal C/A code. The demodulated signal is produced by the L1 acquisition/tracker 20.

The CNAV message acquirer 31 acquires, for every reception satellite, the various kinds of information, such as the ephemeris contained in the CNAV message, from a demodulated signal obtained by multiplying the L2 baseband signal by the L2 internal carrier and the internal L2C code. The demodulated signal is produced by the L2 acquisition/tracker 21.

Based on the observation data obtained by the acquisition/tracking unit 2, the pseudorange processor 4 generates, for every reception satellite, a pseudorange to be used by the calculator 6 and outputs it.

Based on the information acquired by the navigation message acquiring unit 3, the navigation message processing unit 5 outputs to the calculator 6 the ephemeris, the ionospheric parameter, the UTC parameter, and the almanac that are to be used by the calculator 6.

Note that, the processings performed by the pseudorange processor 4 and the navigation message processor 5 are described in detail later.

The calculator 6 uses the pseudoranges for four or more reception satellites, which are outputted from the pseudorange processor 4, the ephemerises for the four or more reception satellites, which are outputted from the navigation message processor 5, and the ionospheric parameter, which is outputted from the navigation message processor 5, and performs positioning calculation in which a position of the GNSS receiver 100 and the GPS times are obtained. Further, the calculator 6 converts the obtained GPS times into the UTC time based on the UTC parameter outputted from the navigation message processor 5. Then, the calculator 6 outputs the position of the GNSS receiver 100 and the UTC time, which are obtained, to outside through the data transceiver 7.

Moreover, the calculator 6 uses the almanac outputted from the navigation message processor 5 to obtain each of general positions of the GPS satellites. The calculator 6 estimates the satellite in view based on each of the obtained general positions of the GPS satellites. The estimation result of the satellites in view is used when the acquisition/tracking unit 2 starts the acquisition of the GNSS signal.

When the L1 acquisition/tracker 20 starts the acquisition of the L1C/A signal after the power of the GNSS receiver 100 is turned on, it first determines a code pattern of the internal C/A code to be set for each processing channel, based on the estimation result of the satellite in view from the calculator 6. Further, when the L1 acquisition/tracker 20 cannot acquire the L1C/A signal in a certain processing channel, it refers to the estimation result of the satellite in view from the calculator 6 and determines a code pattern of the internal C/A code to be set for the processing channel. Thereby, the L1 acquisition/tracker 20 performs the acquisition operation on the satellite in view and the acquisition of the L1C/A signal is promptly completed.

Similar to the L1 acquisition/tracker 20, when the L2 acquisition/tracker 21 starts the acquisition of the L2C signal after the power of the GNSS receiver 100 is turned on, it first determines a code pattern of the internal L2C code to be set for each processing channel, based on the estimation result of the satellite in view by the calculator 6. Further, when the L2 acquisition/tracker 21 cannot acquire the L2C signal in a certain processing channel, it refers to the estimation result of the satellite in view from the calculator 6 and determines a code pattern of the internal L2C code to be set for the processing channel. Thereby, the L2 acquisition/tracker 21 performs the acquisition operation on the satellite in view and the acquisition of the L2C signal is promptly completed.

Operation of Navigation Message Processor

Next, the operation of the navigation message processor 5 is explained in detail. A plurality of operation examples of the navigation message processor 5 are explained as follows. Hereinafter, a target reception satellite to be explained is referred to as the "target reception satellite."

First Operation Example

Figure 2:
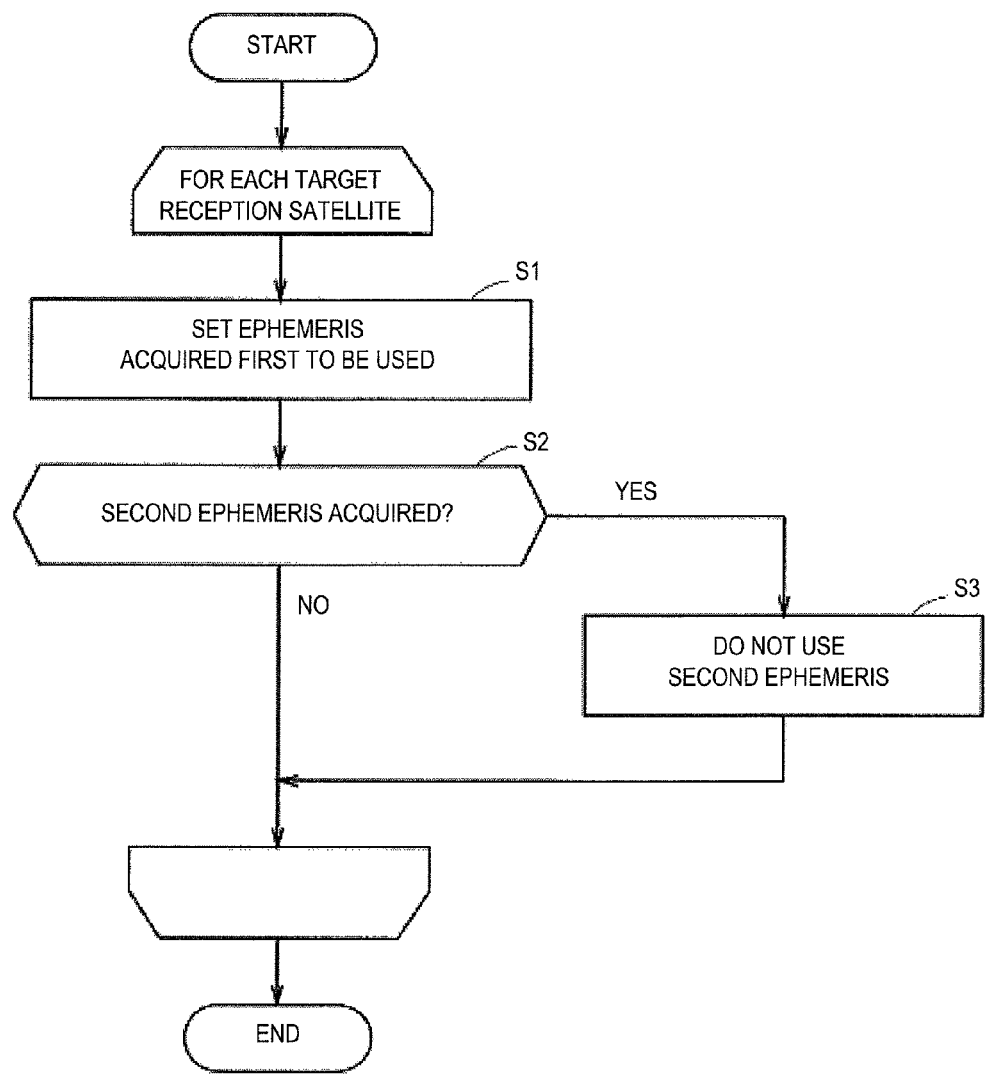
FIG. 2 is a flowchart showing an example of a first operation of a navigation message processor according to the embodiment of the invention.

FIG. 2 shows a first operation example of the navigation message processor 5 when the navigation message processor 5 determines the ephemeris to be used by the calculator 6. In this operation example, regarding each reception satellite, irrespective of whether the both of the NAV ephemeris and the CNAV ephemeris are acquired or only either one of them is acquired by the navigation message acquiring unit 3, the ephemeris acquired first by the navigation message acquiring unit 3 between those is set to be used.

As shown in FIG. 2, at Step S1, regarding the target reception satellite, the navigation message processor 5 sets the first ephemeris (e.g., the NAV ephemeris) between the NAV ephemeris and the CNAV ephemeris acquired by the navigation message acquiring unit 3, to be used. Then, the navigation message processor 5 outputs the to-be-used ephemeris to the calculator 6. Then, at Step S2, if the second ephemeris for the target reception satellite (e.g., the CNAV ephemeris) is acquired by the navigation message acquiring unit 3, at Step S3, the navigation message processor 5 does not set this ephemeris to be used and does not output it to the calculator 6. Then, the navigation message processor 5 ends the processing for the target reception satellite.

Further, even in a case where the second ephemeris for the target reception satellite is not acquired by the navigation message acquiring unit 3 at Step S2, the navigation message processor 5 ends the processing for the target reception satellite.

Here, the case where the navigation message acquiring unit 3 does not acquire the second ephemeris for the target reception satellite, that is the case where only either one of the NAV ephemeris and the CNAV ephemeris is acquired by the navigation message acquiring unit 3, may be considered to occur roughly in two cases. The first case is when, for example, because of a failure in the target reception satellite, the target reception satellite only transmits either one of the L1C/A signal and the L2C signal and the receiver 1 only receives either one of the L1C/A signal and the L2C signal. The second case is when, although the receiver 1 receives both of the L1C/A signal and the L2C signal, because the reception level of either one of the L1C/A signal and the L2C signal is, for example, low, an appropriate demodulated signal for the one signal cannot be obtained.

The navigation message processor 5 performs the above processings of Steps S1 to S3 for each reception satellite every time a new ephemeris is obtained.

When the calculator 6 is inputted with the ephemeris for one of the reception satellites from the navigation message processor 5, it uses the ephemeris to calculate a position of the reception satellite. Then, after the calculator 6 obtains positions of the four or more reception satellites, it uses the positions and the pseudoranges to perform the positioning calculation.

Figure 3:
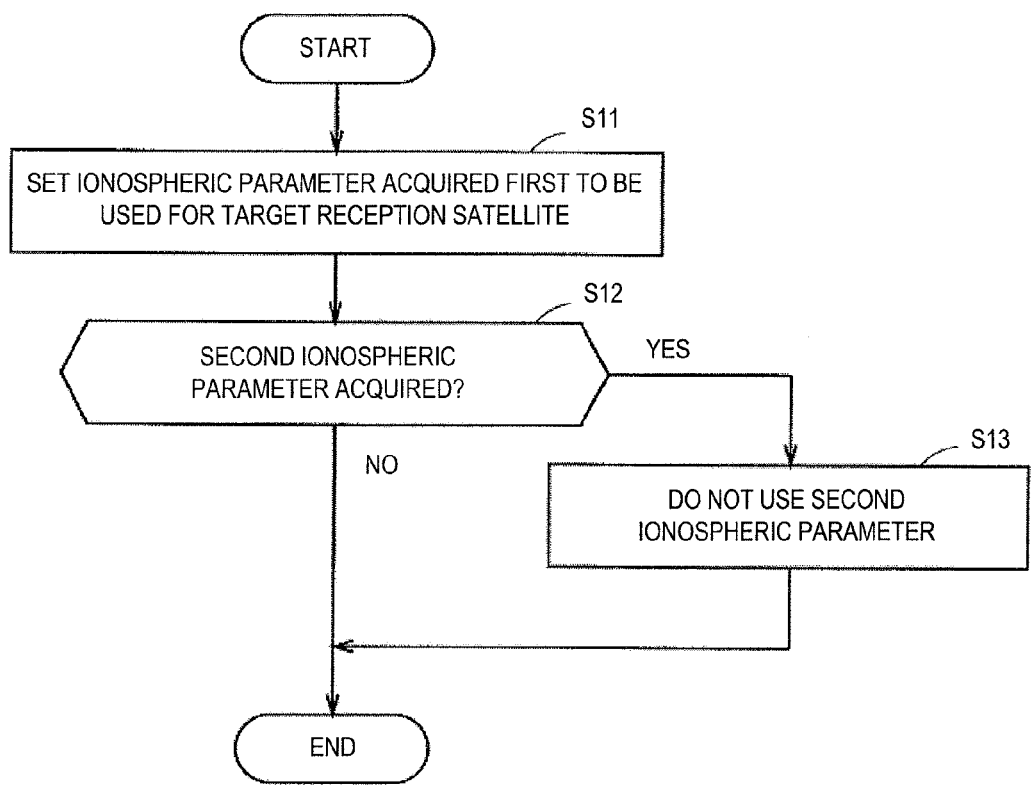
FIG. 3 is a flowchart showing an example of a first operation of the navigation message processor according to the embodiment of the invention.

FIG. 3 is a flowchart showing the first operation example of the navigation message processor 5 when the navigation message processor 5 determines the ionospheric parameter to be used by the calculator 6. As shown in FIG. 3, at Step S11, regarding the target reception satellite, the navigation message processor 5 outputs the first ionospheric parameter (e.g., the NAV ionospheric parameter) between the NAV ionospheric parameter and the CNAV ionospheric parameter acquired by the navigation message acquiring unit 3 to the calculator 6 to be used. Here, a transmission time interval of the NAV ionospheric parameter from one GPS satellite is 12.5 minutes, and a transmission time interval of the CNAV ionospheric parameter from one GPS satellite is 228 seconds at the most. Therefore, the CNAV ionospheric parameter tends to be acquired earlier than the NAV ionospheric parameter.

Then, at Step S12, if the second ionospheric parameter for the target reception satellite (e.g., the CNAV ionospheric parameter) is acquired by the navigation message acquiring unit 3, at Step S13, the navigation message processor 5 does not set this ionospheric parameter to be used and does not output it to the calculator 6. Then, the navigation message processor 5 ends the processing. Further, in a case where the second ionospheric parameter for the target reception satellite cannot be acquired by the navigation message acquiring unit 3 at Step S12, the navigation message processor 5 also ends the processing.

When an ionospheric parameter for the target reception satellite is newly acquired by the navigation message acquiring unit 3, the navigation message processor 5 performs the similar processing as above and outputs the to-be-used ionospheric parameter to the calculator 6. Further, also when an ionospheric parameter for another reception satellite is acquired by the navigation message acquiring unit 3, the navigation message processor 5 performs the similar processing as above and outputs the to-be-used ionospheric parameter for the reception satellite to the calculator 6.

When the calculator 6 is inputted with the ionospheric parameter from the navigation message processor 5, it obtains an ionospheric delay amount by using the ionospheric parameter. Note that, when this ionospheric parameter is inputted from the navigation message processor 5 to the calculator 6, if the calculator 6 has another ionospheric parameter already stored therein, it compares reference time information contained in the ionospheric parameter newly inputted from the navigation message processor 5 and reference time information contained in the ionospheric parameter that has been used for the positioning calculation, and uses the latest information among these information for a positioning calculation from here on. Here, the reference time information contained in certain information is information indicating the time when the certain information has been generated.

Also for the UTC correcting parameter, similar to the case of the ionospheric parameter, for a single reception satellite, regardless of whether the both of the NAV-UTC parameter and the CNAV-UTC parameter are acquired or only either one of them is acquired by the navigation message acquiring unit 3, the navigation message processor 5 according to the first operation example outputs the UTC parameter acquired first by the navigation message acquiring unit 3 between those, to the calculator 6 so as to be used.

After the calculator 6 is inputted with the UTC parameter from the navigation message processor 5, it obtains the UTC time by using the UTC parameter. Note that, when this UTC parameter is inputted from the navigation message processor 5 to the calculator 6, if the calculator 6 has another UTC parameter already stored therein, it compares reference time information contained in the UTC parameter newly inputted from the navigation message processor 5 and reference time information contained in the UTC parameter that has been used, and uses the latest information between these information from here on.

Note that, a transmission time interval of the NAV-UTC parameter from one GPS satellite is 12.5 minutes, and a transmission time interval of the CNAV-UTC parameter from one GPS satellite is 228 seconds at the most. Therefore, the CNAV-UTC parameter tends to be acquired earlier than the NAV-UTC parameter.

Further, also similarly for the almanac parameter, regarding a single reception satellite, irrespective of whether the both of the NAV almanac and the CNAV almanac are acquired or only either one of them is acquired by the navigation message acquiring unit 3, the navigation message processor 5 according to the first operation example outputs the almanac acquired first by the navigation message acquiring unit 3 between those, to the calculator 6 so as to be used.

After the calculator 6 is inputted with the almanac from the navigation message processor 5, it estimates the satellite in view by using the almanac. Note that, when this almanac is inputted from the navigation message processor 5 to the calculator 6, if the calculator 6 has another almanac already stored therein, it compares reference time information contained in orbit information in the almanac newly inputted from the navigation message processor 5 and reference time information contained in the orbit information in the almanac that has been used for each GPS satellite, and uses the latest information between these orbit information from here on.

As above, in this operation example, because the navigation message processor 5 outputs the information of the same kind in either one of the NAV message and the CNAV message, which are acquired by the navigation message acquiring unit 3, the calculator 6 can perform the calculation based on appropriate information between the two information of the same kind.

For example, as described above, the navigation message processor 5 outputs to the calculator 6 the ephemeris that is acquired first by the navigation message acquiring unit 3 between the NAV ephemeris and the CNAV ephemeris, thereby, the calculator 6 can perform the positioning calculation based on the ephemeris acquired first by the navigation message acquiring unit 3. Therefore, the calculator 6 can promptly obtain the position of the reception satellite. As a result, the position of the GNSS receiver 100 and the GPS times can promptly be obtained and a TTFF and time lengths for obtaining the position of the GNSS receiver 100 and the GPS times are obtained are shortened. Thereby, the performance of the GNSS receiver 100 improves.

Further, as described above, the navigation message processor 5 outputs to the calculator 6 the ionospheric parameter that is acquired first by the navigation message acquiring unit 3 between the NAV ionospheric parameter and the CNAV ionospheric parameter, thereby, the calculator 6 can promptly obtain the ionospheric delay amount. As a result, the calculator 6 can promptly obtain the position of the GNSS receiver 100 and the GPS times. Thereby, the time lengths for obtaining the position of the GNSS receiver 100 and the GPS times are obtained are shortened and the performance of the GNSS receiver 100 improves.

Further, the navigation message processor 5 outputs to the calculator 6 the UTC parameter that is acquired first by the navigation message acquiring unit 3 between the NAV-UTC parameter and the CNAV-UTC parameter, thereby, the calculator 6 can promptly obtain the UTC time. As a result, the performance of the GNSS receiver 100 improves.

Further, the navigation message processor 5 outputs to the calculator 6 the almanac that is acquired first by the navigation message acquiring unit 3 between the NAV almanac and the CNAV almanac, thereby, the calculator 6 can promptly obtain the position of each of the GPS satellites. Thereby, the calculator 6 can promptly estimate the satellites in view. As a result, the acquisition and tracking of the GNSS signal can promptly be started after the power of the GNSS receiver 10 is turned on, thereby, the TTFF is shortened and the performance of the GNSS receiver 100 improves.

Moreover, in this operation example, regarding the target reception satellite, in the case where the second ephemeris is not acquired by the navigation message acquiring unit 3, the navigation message processor 5 outputs the ephemeris that is acquired first by the navigation message acquiring unit 3. This is similar to the cases of the ionospheric parameter, the UTC parameter, and the almanac. That is, in a case where, in a navigation message (e.g., CNAV message), that is different from another navigation message (e.g., NAV message) in which predetermined information acquired by the navigation message acquiring unit 3 (e.g., NAV ephemeris) is contained, the same kind of information as the predetermined information (e.g., CNAV ephemeris) is not acquired by the navigation message acquiring unit 3, the navigation message processor 5 outputs the predetermined information acquired by the navigation message acquiring unit 3. Alternatively, in a case where the receiver 1 only receives one kind of a GPS signal (e.g., L1C/A signal), the navigation message processor 5 outputs predetermined information contained in the one kind of the GPS signal (e.g., NAV ephemeris), which is acquired by the navigation message acquiring unit 3. Therefore, regardless of the kind of the navigation message in which the predetermined information acquired by the navigation message acquiring unit 3 is contained, the calculation can be performed by the calculator 6 based on the predetermined information. Thereby, the calculation result in the calculator 6 can promptly be obtained, and the performance of the GNSS receiver 100 improves.

Note that, even in a case where a plurality of kinds of signals that are three kinds or more where different navigation messages are superimposed on each other are transmitted from each GPS satellite, similar to the flowcharts in FIGS. 2 and 3, by inputting, among a plurality of same kind of information contained in a plurality of kinds of navigation messages that are superimposed on the plurality of kinds of signals, respectively, the information acquired first by the navigation message acquiring unit 3 to the calculator 6, the similar effects can be obtained.

Second Operation Example

Figure 4:
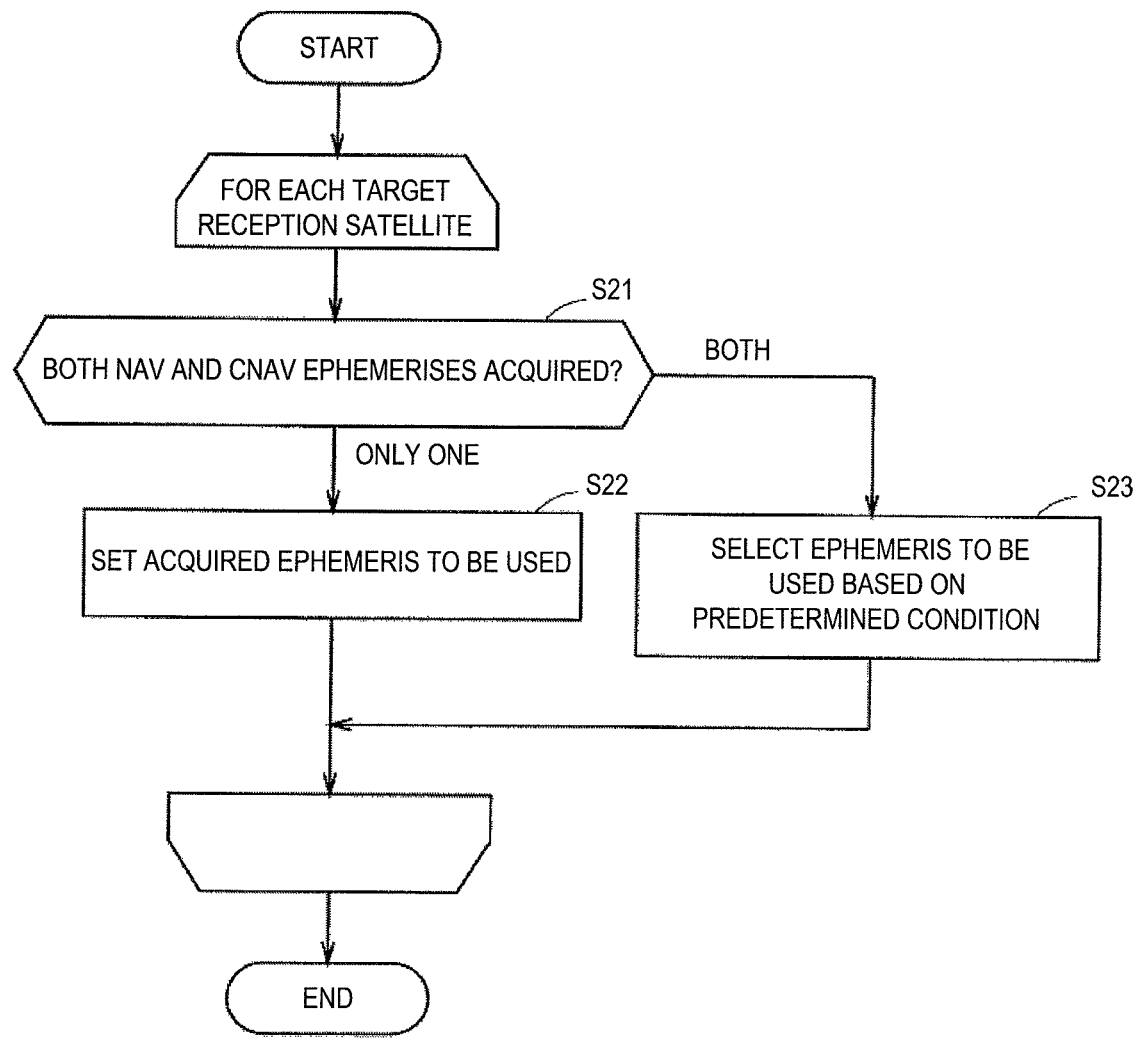
FIG. 4 is a flowchart showing an example of a second operation of the navigation message processor according to the embodiment of the invention.

FIG. 4 shows a second operation example of the navigation message processor 5 when the navigation message processor 5 determines the ephemeris to be used by the calculator 6. In this operation example, regarding to each reception satellite, in the case where either one of the NAV ephemeris and the CNAV ephemeris is acquired by the navigation message acquiring unit 3, the acquired ephemeris is set to be used, and in the case where the NAV ephemeris and the CNAC ephemeris are acquired, the to-be-used ephemeris is selected between the NAV ephemeris and the CNAV ephemeris based on a predetermined condition.

As shown in FIG. 4, at Step S21, the navigation message processor 5 determines whether both of the NAV ephemeris and the CNAV ephemeris are acquired by the navigation message acquiring unit 3, regarding the target reception satellite. If, at Step S21, only one of the NAV ephemeris and the CNAV ephemeris is determined to be acquired, at Step S22, the navigation message processor 5 outputs, as the ephemeris to be used, the either one of the ephemerises that is acquired, to the calculator 6.

On the other hand, if, at Step S21, both of the NAV ephemeris and the CNAV ephemeris are determined to be acquired by the navigation message acquiring unit 3, at Step S23, the navigation message processor 5 selects the ephemeris to be used from the acquired NAV ephemeris and CNAV ephemeris based on the predetermined condition, and outputs it to the calculator 6.

At Step S23, for example, the navigation message processor 5 selects the ephemeris with a higher accuracy between the NAV ephemeris and the CNAV ephemeris. The CNAV ephemeris has an information amount larger than that of the NAV ephemeris and an accuracy higher than that thereof. Therefore, in the case where both of the NAV ephemeris and the CNAV ephemeris are acquired, the navigation message processor 5 selects the CNAV ephemeris to be used.

Alternatively, at Step S23, the navigation message processor 5 may select the one with the latest information to be used between the acquired NAV ephemeris and CNAV ephemeris. Each of the NAV ephemeris and the CNAV ephemeris contains reference time information indicating a time when the corresponding ephemeris was generated, therefore, the navigation message processor 5 compares the reference time information of the NAV ephemeris and the CNAV ephemeris with each other, and thereby, it can identify the latest information therebetween.

Alternatively, at Step S23, the navigation message processor 5 may select the one with the highest reliability to be used between the acquired NAV ephemeris and CNAV ephemeris. Each of the NAV ephemeris and the CNAV ephemeris contains health information indicating whether the operation of the GPS satellite from which the navigation message is transmitted is normal. The navigation message processor 5 refers to the health information of the NAV message and the CNAV message, which is acquired by the navigation message acquiring unit 3, respectively, and checks the operating states of the GPS satellite when the navigation messages are transmitted therefrom, respectively. Then, in a case where the operation of the GPS satellite when the NAV message is transmitted therefrom is normal and the operation of the GPS satellite when the CNAV message is transmitted therefrom is abnormal, the navigation message processor 5 determines that the NAV ephemeris is more reliable than the CNAV ephemeris and selects the NAV ephemeris to be used. On the other hand, in a case where the operation of the GPS satellite when the NAV message is transmitted therefrom is abnormal and the operation of the GPS satellite when the CNAV message is transmitted therefrom is normal, the navigation message processor 5 determines that the CNAV ephemeris is more reliable than the NAV ephemeris and selects the CNAV ephemeris to be used. Moreover, in a case where the operations of the GPS satellite when the NAV message and CNAV message are transmitted therefrom are both normal, the navigation message processor 5 selects a predetermined one between the NAV ephemeris and the CNAV ephemeris to be used, and in a case where both are abnormal, the navigation message processor 5 selects neither one of the NAV ephemeris and the CNAV ephemeris to be used.

Alternatively, at Step S23, the navigation message processor 5 may select, between the received NAV ephemeris and CNAV ephemeris, the one that is selected by a user, to be used. In this case, the external device connected with the data transceiver 7 of the GNSS receiver 100 is used so that in the case where both of the NAV ephemeris and the CNAV ephemeris are acquired, the user can set the ephemeris for the navigation message processor 5 to select. Thereby, the navigation message processor 5 sets, between the NAV ephemeris and the CNAV ephemeris, the one designated by the user through the data transceiver 7, to be used.

For each reception satellite, the navigation message processor 5 performs the above processing from Steps S21 to S23 every time a new ephemeris is obtained.

Figure 5:
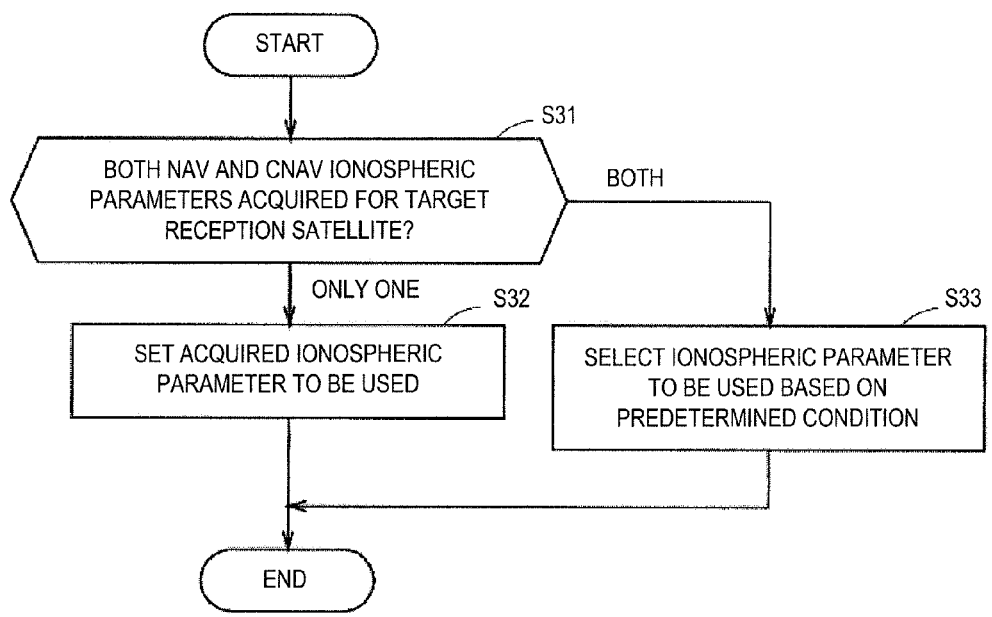
FIG. 5 is a flowchart showing an example of a second operation of the navigation message processor according to the embodiment of the invention.

FIG. 5 is a flow chart indicating the second operation example of the navigation message processor 5 when the navigation message processor 5 determines the ionospheric parameter to be used by the calculator 6. As shown in FIG. 5, at Step S31, the navigation message processor 5 determines whether both of the NAV ionospheric parameter and the CNAV ionospheric parameter are acquired by the navigation message acquiring unit 3, regarding the target reception satellite. If, at Step S31, only one of the NAV ionospheric parameter and the CNAV ionospheric parameter is determined to be acquired, at Step S32, the navigation message processor 5 outputs, as the ionospheric parameter to be used, the either one of the ionospheric parameters that is acquired, to the calculator 6.

On the other hand, if, at Step S31, both of the NAV ionospheric parameter and the CNAV ionospheric parameter are determined to be obtained by the navigation message acquiring unit 3, at Step S33, the navigation message processor 5 selects the ionospheric parameter to be used from the acquired NAV ionospheric parameter and the CNAV ionospheric parameter based on a predetermined condition, and outputs it to the calculator 6. For the selecting condition at Step S33, the similar condition as the selecting condition at the above Step S23 can be adopted. Note that, the CNAV ionospheric parameter has an information amount larger than the NAV ionospheric parameter and has an accuracy higher than that thereof, therefore, at Step S33, in a case where the one with a higher accuracy between the two ionospheric parameters is selected to be used, the CNAV ionospheric parameter is selected to be used.

In a case where a new ionospheric parameter for the target reception satellite is received by the receiver 1, the navigation message processor 5 performs the similar processing and outputs the to-be-used ionospheric parameter to the calculator 6. Further, also in a case where an ionospheric parameter from another reception satellite is received by the receiver 1, the navigation message processor 5 performs the similar processing and outputs the to-be-used ionospheric parameter to the calculator 6.

Also for the UTC parameter, similar to the case of ionospheric parameter, the UTC parameter to be used by the calculator 6 can be determined. The CNAV-UTC parameter has an information amount larger than the NAV-UTC parameter and has an accuracy higher than that thereof, therefore, in a case where both of the NAV-UTC parameter and the CNAV-UTC parameter are received and the one with a higher accuracy is selected to be used, the CNAV-UTC parameter is selected to be used. Further for the almanac, similar to the case of ionospheric parameter, the almanac to be used by the calculator 6 can be determined.

As above, in this operation example, similar to the first operation example described above, because the navigation message processor 5 outputs the information of the same kind in either one of the NAV message and the CNAV message, which are acquired by the navigation message acquiring unit 3, the calculator 6 can perform the calculation based on appropriate information between the two information of the same kind.

For example, as described above, the navigation message processor 5 outputs to the calculator 6 the latest ephemeris between the NAV ephemeris and the CNAV ephemeris, thereby, the calculator 6 can obtain the position of the reception satellite by using the latest ephemeris. Thus, the position of the reception satellite can accurately be obtained, and as a result, the position of the GNSS receiver 100 and the GPS times can accurately be obtained. Similarly, because the calculator 6 can obtain the ionospheric delay amount by using the latest ionospheric parameter, the accurate ionospheric delay amount can be obtained. Further, because the calculator 6 can obtain the UCT time by using the latest UTC parameter, the accurate UTC time can be obtained. Further, because the calculator 6 can obtain the positions of the respective GPS satellites by using the latest almanac, the positions of the respective GPS satellites can further quickly be obtained. Thereby, the performance of the GNSS receiver 100 improves.

Moreover, in this operation example, similar to the first operation example described above, in a case where, in a navigation message that is different from another navigation message in which predetermined information acquired by the navigation message acquiring unit 3 is contained, the same kind of information as the predetermined information is not acquired by the navigation message acquiring unit 3, the navigation message processor 5 outputs the predetermined information acquired by the navigation message acquiring unit 3. Alternatively, in a case where the receiver 1 only receives one kind of a GPS signal, the navigation message processor 5 outputs the predetermined information contained in the one kind of the GPS signal, which is acquired by the navigation message acquiring unit 3. Therefore, regardless of the kind of the navigation message within which the predetermined information acquired by the navigation message acquiring unit 3 is contained, the calculation can be performed by the calculator 6 based on the predetermined information. Thereby, the calculation result in the calculator 6 can promptly be obtained, and the performance of the GNSS receiver 100 improves.

Note that, even in a case where a plurality of kinds of signals that are three kinds or more where different navigation messages are superimposed on each other are transmitted from each GPS satellite, similar to the flowcharts in FIGS. 4 and 5, if a plurality of same kind of information contained in a plurality of kinds of navigation messages that are superimposed on the plurality of kinds of signals, respectively, are acquired by the navigation message acquiring unit 3, by selecting the information to be used by the calculator 6 from the plurality of same kind of information based on the predetermined condition, the calculator 6 can use appropriate information and perform the predetermined calculation. Further, in the case where only one of the plurality of same kind of information is acquired by the navigation message acquiring unit 3, by setting the acquired information to be used, regardless of the kind of the navigation message in which the to-be-used information is contained, the calculator 6 can use the information and perform the calculation. Therefore, the calculation result in the calculator 6 can promptly be obtained.

Operation of Pseudorange Processor

Next, the operation of the pseudorange processor 4 is explained in detail. Hereinafter, a plurality of operation examples of the pseudorange processor 4 are explained.

First Operation Example

Figure 6:
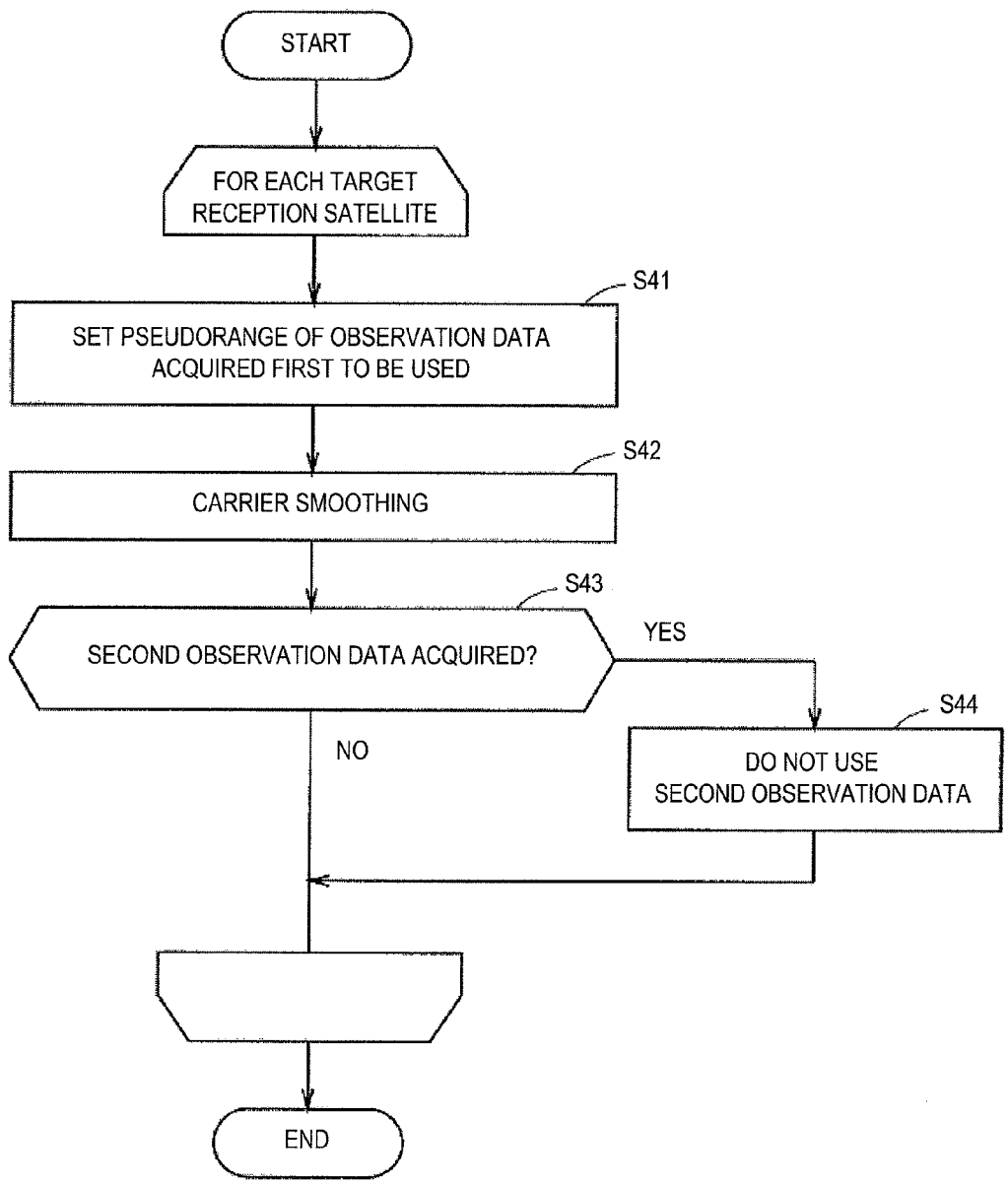
FIG. 6 is a flowchart showing an example of a first operation of a pseudorange processor according to the embodiment of the invention.

FIG. 6 is a flowchart showing a first operation example of the pseudorange processor 4. In this operation example, regarding each reception satellite, irrespective of whether the both of the L1 observation data and the L2 observation data are obtained or only either one of them is obtained, the pseudorange contained in the observation data obtained first by the acquisition/tracking unit 2 between the L1 observation data and the L2 observation data is set as a pseudorange to be used in positioning calculation.

As shown in FIG. 6, at Step S41, for the target reception satellite, the pseudorange processor 4 sets a pseudorange contained in the observation data that is obtained first by the acquisition/tracking unit 2 between the L1 observation data and the L2 observation data (e.g., L1 observation data), to be used. Then, at Step S42, the pseudorange processor 4 uses the ADR contained in the observation data and performs carrier smoothing on the pseudorange contained in the observation data acquired first, that is, the to-be-used pseudorange. Further, the pseudorange processor 4 outputs the carrier-smoothed pseudorange to the calculator 6.

Then, after the second observation data on the target reception satellite (e.g., L2 observation data) is obtained by the acquisition/tracking unit 2 at Step S43, at Step S44, the pseudorange processor 4 does not set the observation data to be used and does not output it to the calculator 6. Then, the pseudorange processor 4 ends the processing for the target reception satellite. Further, also in a case where the second observation data on the target reception satellite is not obtained at Step S43, the pseudorange processor 4 ends the processing for the target reception satellite.

For each reception satellite, the pseudorange processor 4 performs the above processing from Steps S41 to S44 every time new observation data is obtained.

After the pseudoranges for four or more satellites are inputted to the calculator 6 from the pseudorange processor 4, the calculator 6 uses an ionospheric delay parameter that is inputted from the navigation message processor 5 and obtains the ionospheric delay amount. The ionospheric delay parameter is determined based on a model indicating the ionospheric delay, referred to as "Klobuchar Model." The calculator 6 corrects each of the pseudoranges inputted from the pseudorange processor 4 by using the obtained ionospheric delay amount and removes influence of the ionospheric delay from each pseudorange. Then, the calculator 6 performs the positioning calculation by using the respective corrected pseudoranges.

As above, in this operation example, because, regardless of the L1 observation data or the L2 observation data, the pseudorange contained in the observation data obtained first is set to be used in the positioning calculation, the pseudoranges for four satellites can promptly be acquired compared to a GPS receiver for receiving only an L1C/A signal and a GPS receiver for receiving only an L2C signal. As a result, the position of the GNSS receiver 100 and the GPS times can promptly be obtained.

For example, in the GPS receiver for receiving only the L1C/A signal, in a case where L1 observation data for only two satellites can be acquired, because pseudoranges for only the two satellites can be obtained, positioning calculation cannot be performed. Whereas, in this first operation example, even in a case where the L1 observation data for only the two satellites can be obtained, as long as the L2 observation data for other two satellites can be received, the pseudoranges for the four satellites can be obtained, thereby, the positioning calculation can be performed. Therefore, the position of the GNSS receiver 100 and the GPS times can promptly be acquired and time lengths for obtaining the position of the GNSS receiver 100 and the GPS times are obtained, for example the TTFF (Time To First Fix), are shortened. Thereby, the performance of the GNSS receiver 100 improves.

Note that, as the observation data, only the pseudorange may be obtained by the acquisition/tracking unit 2. In this case, the pseudorange processor 4 does not execute the Step S2 for each reception satellite, and inputs the pseudorange that is obtained first by the acquisition/tracking unit 2 to the calculator 6 so as to be used as it is.

Further, in a case where a plurality of kinds of signals that are three kinds or more where carrier frequencies are different from each other are transmitted from each reception satellite, the pseudorange of the observation data that is obtained first among the plurality of observation data that are obtained from the plurality of kinds of signals, respectively, may be used as the pseudorange to be used in the positioning calculation.

Second Operation Example

Figure 7:
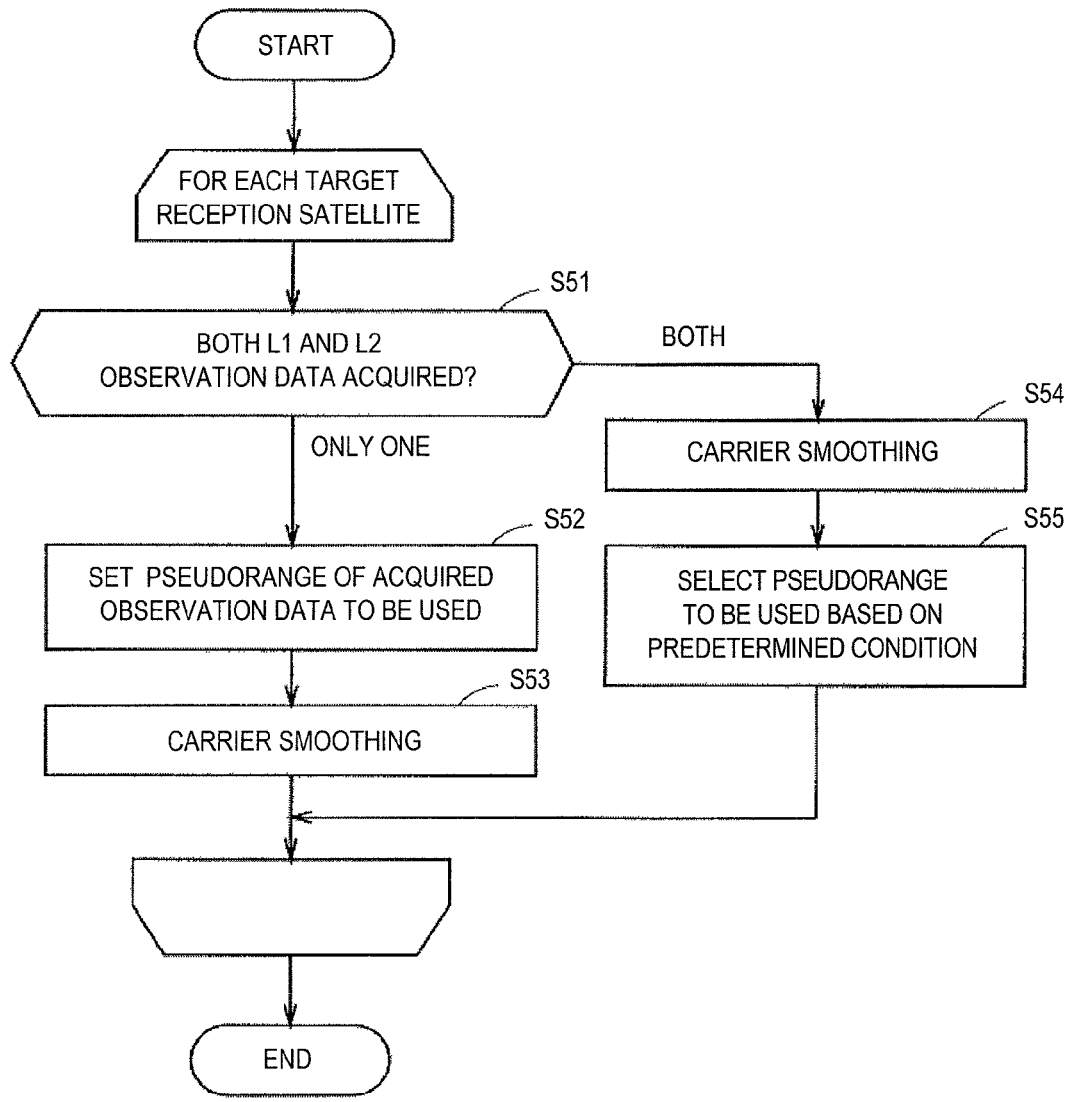
FIG. 7 is a flowchart showing an example of a second operation of the pseudorange processor according to the embodiment of the invention.

FIG. 7 is a flowchart showing a second operation example of the pseudorange processor 4. In this operation example, regarding each reception satellite, in the case where only either one of the L1 observation data and the L2 observation data is obtained, the pseudorange contained in the obtained observation data is to be used and, in the case where the L1 observation data and the L2 observation data are obtained, the pseudorange to be used is selected between the pseudoranges contained in the L1 observation data and the L2 observation data based on a predetermined condition.

As shown in FIG. 7, at Step S51, the pseudorange processor 4 determines whether both of the L1 observation data and the L2 observation data are acquired by the acquisition/tracking unit 2, for the target reception satellite. If, at Step S51, only one of the L1 observation data and the L2 observation data is determined to be acquired, at Step S52, the pseudorange processor 4 sets the pseudorange contained in the obtained observation data to be used. Further, at Step S53, the pseudorange processor 4 uses the ADR contained in the observation data and performs carrier smoothing on the pseudorange contained in the obtained observation data, that is, the to-be-used pseudorange. The carrier-smoothed pseudorange is inputted to the calculator 6.

On the other hand, if both of the L1 observation data and the L2 observation data are determined to be obtained by the acquisition/tracking unit 2 at Step S51, at Step S54, the pseudorange processor 4 performs carrier smoothing to the respective pseudoranges contained in the L1 and L2 observation data. Specifically, for the pseudorange contained in the L1 observation data, the pseudorange processor 4 uses the ADR contained in the L1 observation data and performs the carrier smoothing, and for the pseudorange contained in the L2 observation data, the pseudorange processor 4 uses the ADR contained in the L2 observation data and performs the carrier smoothing.

Then, at Step S55, the pseudorange processor 4 selects the pseudorange to be used from the carrier-smoothed pseudorange obtained from the L1 observation data (hereinafter, it may be referred to as the "corrected L1 pseudorange") and the carrier-smoothed pseudorange obtained from the L2 observation data (hereinafter, it may be referred to as the "corrected L2 pseudorange"), based on the predetermined condition. Further, the pseudorange processor 4 outputs the pseudorange selected to be used, to the calculator 6.

At Step S55, for example, based on the reception level of the L1C/A signal at the receiver 1 and the reception level of the L2C signal at the receiver 1, the pseudorange processor 4 selects the pseudorange to be used, from the corrected L1 pseudorange and the corrected L2 pseudorange. In this case, first, the pseudorange processor 4 compares the reception levels of the L1C/A signal and the L2C signal at the receiver 1 (e.g., C/N0 (carrier-to-noise density ratio), which are transmitted from the target reception satellite, with each other. The reception level of the L1C/A signal at the receiver 1 is obtained from the L1 baseband signal by the L1 acquisition/tracker 20, and the reception level of the L2C signal at the receiver 1 is obtained from the L2 baseband signal by the L2 acquisition/tracker 21. When the reception level of the L1C/A signal is comparatively higher, the pseudorange processor 4 selects the corrected L1 pseudorange to be used, and when the reception level of the L2C signal is comparatively higher, the pseudorange processor 4 selects the corrected L2 pseudorange to be used. Further, in a case where the reception levels of the L1C/A signal and the L2C signal are the same, the pseudorange processor 4 selects a predetermined one of the pseudoranges (e.g., the corrected L1 pseudorange) to be used.

Alternatively, at Step S55, the pseudorange processor 4 may select, between the corrected L1 and L2 pseudoranges, the one that is selected by the user, to be used. In this case, the external device connected with the data transceiver 7 of the GNSS receiver 100 is used so that in the case where both of the corrected L1 and L2 pseudoranges are acquired, the user can set the pseudorange for the pseudorange processor 4 to select. Thereby, the pseudorange processor 4 sets, between the corrected L1 and L2 pseudoranges the one designated by the user through the data transceiver 7 to be used.

Further, in a case where the GNSS receiver 100 according to this embodiment includes a reception circuit for receiving a signal from a stationary satellite of an SBAS (Satellite-Based Augmentation System) such as a WAAS (Wide Area Augmentation System), at Step S55, the pseudorange processor 4 may select one from the corrected L1 and L2 pseudoranges based on the SBAS signal received by the reception circuit. For example, regarding a single reception satellite, in a case where correction information on the pseudorange of the L1 observation data is transmitted from the stationary satellite of the SBAS, the pseudorange processor 4 selects the corrected L1 pseudorange to be used for the reception satellite. Further, regarding another single reception satellite, in a case where correction information on the pseudorange of the L2 observation data is transmitted from the stationary satellite of the SBAS, the pseudorange processor 4 selects the corrected L2 pseudorange to be used for the reception satellite. Then the pseudorange processor 4 corrects the selected pseudorange once more based on the correction information from the SBAS, and outputs the re-corrected pseudorange to the calculator 6.

The pseudorange processor 4 performs the above processing from Steps S51 to S55 every time new observation data is obtained, for each reception satellite.

After the pseudoranges for four or more satellites are inputted to the calculator 6 from the pseudorange processor 4, as described above, the calculator 6 uses the ionospheric parameter and obtains an ionospheric delay amount. Further, the calculator 6 corrects each of the pseudoranges inputted from the pseudorange processor 4 by using the obtained ionospheric delay amount and removes influence of the ionospheric delay from each pseudorange. Then, the calculator 6 performs the positioning calculation by using the respective corrected pseudoranges.

As above, in this operation example, in the case where the L1 and L2 observation data are obtained, the pseudorange to be used is selected from the pseudoranges contained in the L1 and L2 observation data, respectively, based on the predetermined condition. Therefore, the positioning calculation can be performed by using an appropriate pseudorange between the pseudoranges contained in the L1 and L2 observation data.

Further, as described above, in the case where only one of the L1 observation data and the L2 observation data is acquired, by setting the pseudorange contained in the acquired observation data to be used, regardless of the obtained data being the L1 observation data or the L2 observation data, the pseudorange of the obtained observation data can be used in the positioning calculation. Thereby, the pseudoranges for four satellites can promptly be acquired, and the position of the GNSS receiver 100 and the GPS times can promptly be obtained. As a result, the performance of the GNSS receiver 100 improves.

Further, as described above, in the case where the L1 observation data and the L2 observation data for a certain reception satellite are obtained, by selecting, between the pseudoranges thereof, based on the reception levels of the L1C/A signal and the L2C signal transmitted from the reception satellite, the pseudorange to be used, the positioning calculation can be performed by using the pseudorange obtained from the GPS signal in a good reception state. Thereby, the position of the GNSS receiver 100 and the GPS times can be obtained by using the highly accurate pseudorange, and the accuracies of the position of the GNSS receiver 100 and the GPS times improve.

Further, in the case where the L1 observation data and the L2 observation data are obtained, between the pseudoranges thereof, by setting the one designated by the user as the one to be used, the positioning calculation can be performed by using the appropriate pseudorange that the user requests. Thereby, the position of the GNSS receiver 100 and the GPS times can appropriately be obtained and the performance of the GNSS receiver improves.

Note that, as the observation data, only the pseudorange may be obtained by the acquisition/tracking unit 2. In this case, the Steps S53 and S54 are not executed, and the pseudorange that is not performed with the carrier smoothing is inputted to the calculator 6.

Further, in a case where a plurality of kinds of signals that are three kinds or more where carrier frequencies are different from each other are transmitted from each reception satellite, if only one of the plurality of observation data that are obtained from the plurality of kinds of signals, respectively, can be obtained, the pseudorange of the one of the observation data may be set to be used, and if the plurality of observation data are obtained, from the pseudoranges of the plurality of observation data, a single pseudorange may be selected to be used based on the predetermined condition.

Third Operation Example

Figure 8:
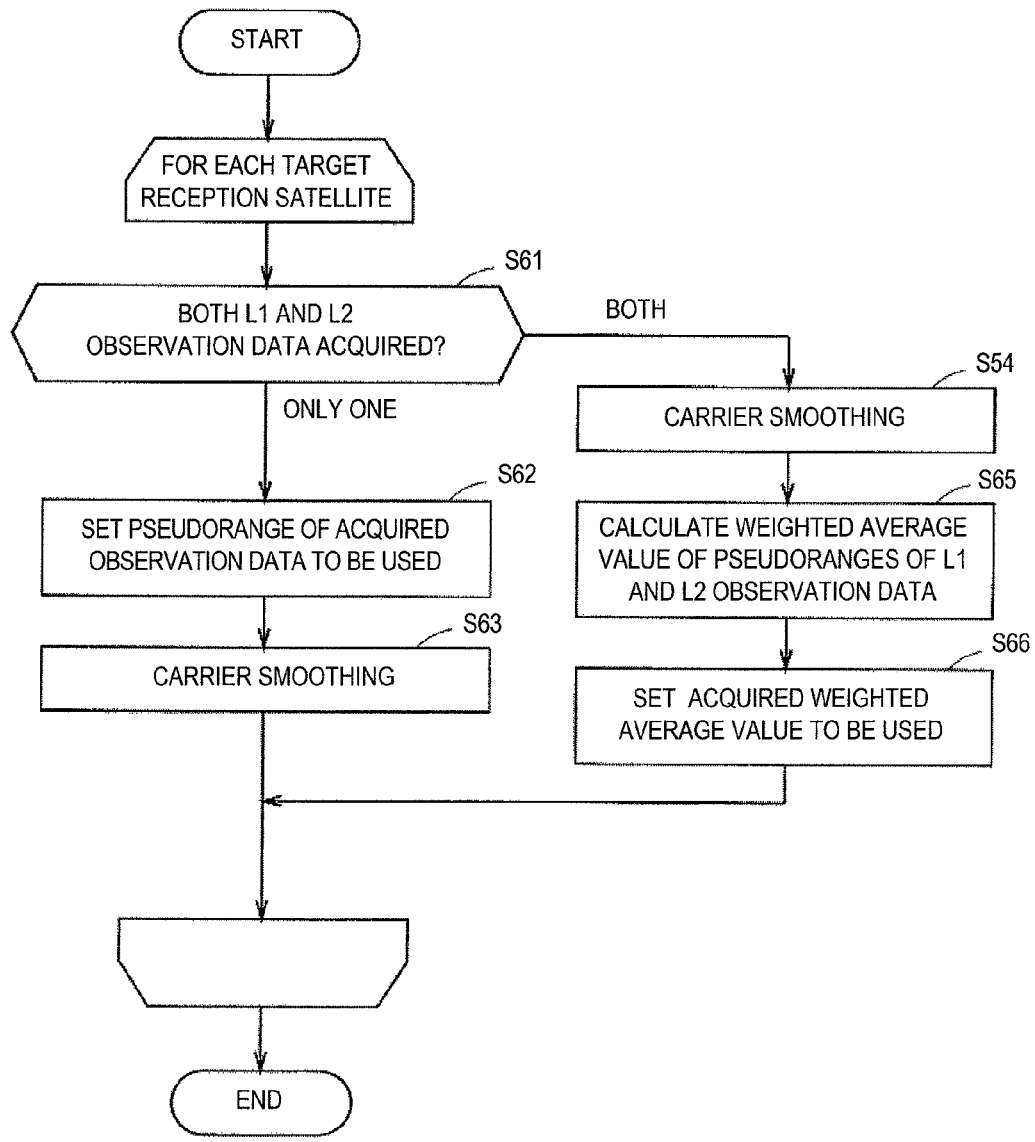
FIG. 8 is a flowchart showing an example of a third operation of the pseudorange processor according to the embodiment of the invention.

FIG. 8 is a flowchart showing a third operation example of the pseudorange processor 4. In this operation example, regarding each reception satellite, in the case where only either one of the L1 observation data and the L2 observation data is obtained, the pseudorange contained in the obtained observation data is set to be used, and in the case where the L1 observation data and the L2 observation data are obtained, a weighted average value of the pseudoranges thereof is obtained and the obtained weighted average value is set to be the pseudorange to be used.

As shown in FIG. 8, at Step S61, the pseudorange processor 4 determines whether both of the L1 observation data and the L2 observation data are acquired by the acquisition/tracking unit 2, for the target reception satellite. If, at Step S61, only one of the L1 observation data and the L2 observation data is determined to be acquired, at Step S62, the pseudorange processor 4 selects the pseudorange contained in the obtained observation data to be used. Further, at Step S63, the pseudorange processor 4 uses the ADR contained in the observation data and performs carrier smoothing on the pseudorange contained in the obtained observation data, that is, the to-be-used pseudorange. The carrier-smoothed pseudorange is inputted to the calculator 6.

On the other hand, if both of the L1 observation data and the L2 observation data are determined to be obtained by the acquisition/tracking unit 2 at Step S61, the pseudorange processor 4 performs carrier smoothing to the respective pseudoranges contained in the L1 and L2 observation data at Step S64. Specifically, for the pseudorange contained in the L1 observation data, the pseudorange processor 4 uses the ADR contained in the L1 observation data and performs the carrier smoothing, and for the pseudorange contained in the L2 observation data, the pseudorange processor 4 uses the ADR contained in the L2 observation data and performs the carrier smoothing. Thereby, the corrected L1 pseudorange and the corrected L2 pseudorange are obtained.

Then, at Step S65, the pseudorange processor 4 obtains the weighted average value of the corrected L1 pseudorange and the corrected L2 pseudorange. Specifically, the pseudorange processor 4 performs weighting on each of the corrected L1 pseudorange and the corrected L2 pseudorange according to the reception level of the corresponding GPS signal (the L1C/A signal or the L2C signal), and obtains the average value of both the weighted pseudoranges. For example, in a case where the reception level of the L1C/A signal is higher than the reception level of the L2C signal, a weight that is to be set for the corrected L1 pseudorange is set larger than a weight that is to be set for the corrected L2 pseudorange and the average value of both the weighted pseudoranges is obtained. Then, the pseudorange processor 4 inputs the weighted average value obtained at Step S66, to the calculator 6 as the pseudorange to be used.

For each reception satellite, the pseudorange processor 4 performs the above processing from Steps S61 to S66 every time a new observation data is obtained.

After the pseudoranges for four or more satellites are inputted to the calculator 6 from the pseudorange processor 4, as described above, the calculator 6 uses the ionospheric parameter and obtains the ionospheric delay amount. Further, the calculator 6 corrects each of the pseudoranges inputted from the pseudorange processor 4 by using the obtained ionospheric delay amount and removes influence of the ionospheric delay from each pseudorange. Then, the calculator 6 performs the positioning calculation by using the respective corrected pseudoranges.

As above, in this operation example, in the case where all of the L1 and L2 observation data are obtained, because the weighted average value of the pseudoranges of the L1 observation data and the L2 observation data is set to be used, the positioning calculation can be performed by using a pseudorange with the least number of noise components therein. Thereby, the position of the GNSS receiver 100 and the GPS times can be obtained by using the highly accurate pseudorange. As a result, the accuracies of the position of the GNSS receiver 100 and the GPS times improve.

Further, as described above, in the case where only one of the L1 observation data and the L2 observation data is acquired, by setting the pseudorange of the acquired observation data to be used, regardless of the obtained data being the L1 observation data or the L2 observation data, the pseudorange of the obtained observation data can be used in the positioning calculation. Thereby, the pseudoranges for four satellites can promptly be acquired, and the position of the GNSS receiver 100 and the GPS times can promptly be obtained. As a result, the performance of the GNSS receiver 100 improves.

Note that, as the observation data, only the pseudorange may be obtained by the acquisition/tracking unit 2. In this case, the Steps S63 and S64 are not executed, and the pseudorange that is not performed with the carrier smoothing is inputted to the calculator 6.

Further, in the case where a plurality of kinds of signals that are three kinds or more where carrier frequencies are different from each other are transmitted from each reception satellite, if only one of the plurality of observation data that are obtained from the plurality of kinds of signals, respectively, can be obtained, the pseudorange of the one of the observation data may be set to be used, and if the plurality of observation data are obtained, a weighted average value of the pseudoranges of the plurality of observation data may be set to be the pseudorange to be used.

Fourth Operation Example

Figure 9:
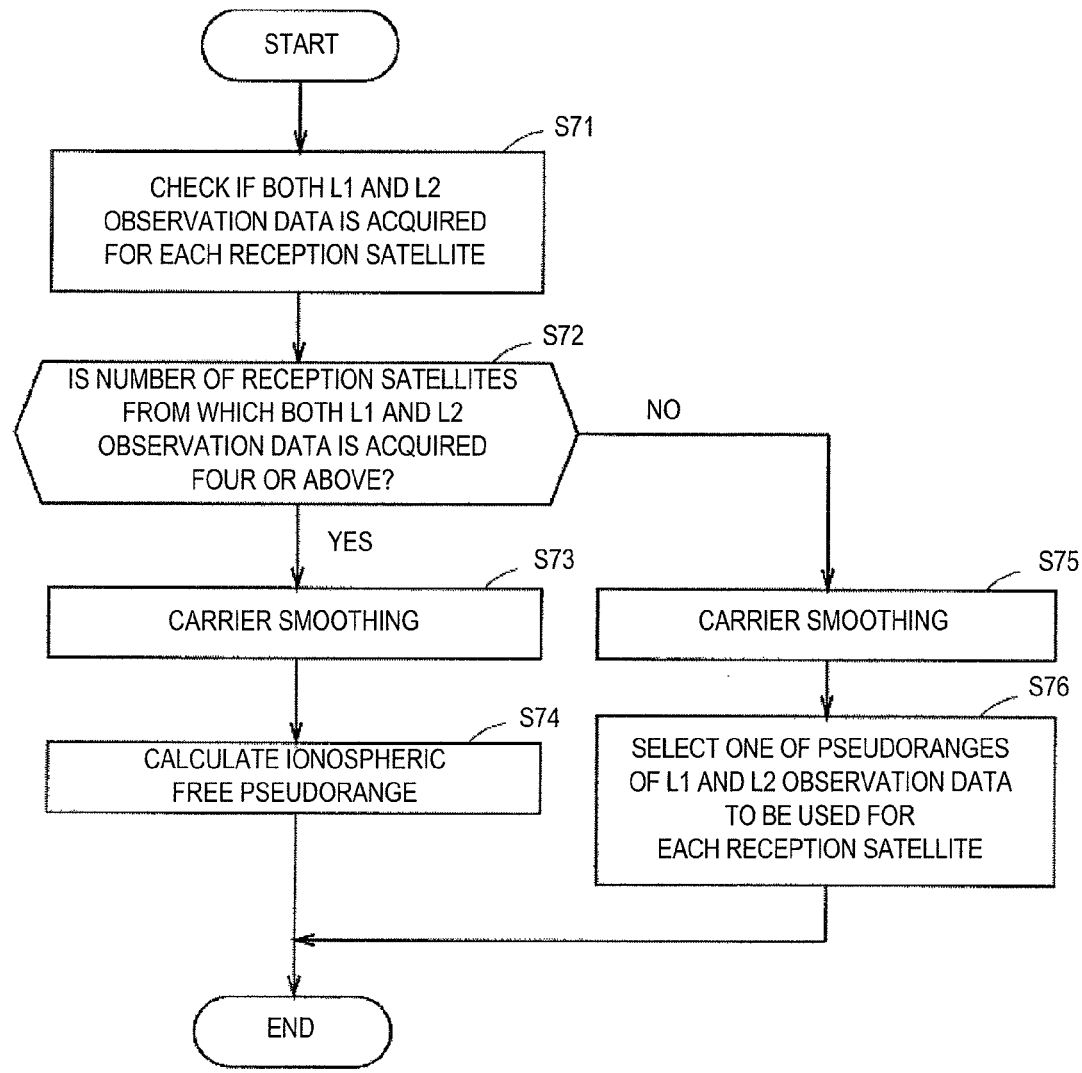
FIG. 9 is a flowchart showing an example of a fourth operation of the pseudorange processor according to the embodiment of the invention.

FIG. 9 is a flowchart showing a fourth operation example of the pseudorange processor 4.

As disclosed in the above Patent Document 2, the art of obtaining, by using the ionospheric free linear combination, a pseudorange from which an influence of an ionospheric delay is removed has been proposed. Here, the pseudorange from which the influence of the ionospheric delay is removed is referred to as the "ionospheric free pseudorange." By the ionospheric free linear combination, by using two pseudoranges that are respectively obtained from two kinds of wireless signals transmitted from the same GPS satellite and having carrier frequencies different from each other, the ionospheric free pseudorange is obtained. Specifically, the ionospheric free pseudorange rt is obtained from the following Equation (1).

$$rt = (f1^2 \times r1 - f2^2 \times r2)/(f1^2 - f2^2) \quad (1)$$

Note that, f1 and f2 indicate the carrier frequencies of the L1C/A signal and the L2C signal, that is the L1 frequency and the L2 frequency, respectively. Further, r1 indicates a pseudorange with the influence of the ionospheric delay that is obtained from the L1C/A signal, and r2 indicates a pseudorange with the influence of the ionospheric delay that is obtained from the L2C signal.

Meanwhile, as described above, by using an ionospheric parameter contained in the navigation message from the GPS satellite to obtain the ionospheric delay amount, and correcting the pseudorange obtained from either one of the L1C/A signal and the L2C signal by using the ionospheric delay amount, the influence of the ionospheric delay can be removed from the pseudorange. The pseudorange corrected as above is referred to as the "model corrected pseudorange."

When performing the positioning calculation, because if the ionospheric free pseudorange and the model corrected pseudorange are used in conjunction with each other, the position accuracy and the time accuracy may degrade, therefore, in the case of using the ionospheric free pseudorange, all of the pseudoranges for four or more satellites used in the positioning calculation needs to be the ionospheric free pseudoranges.

Thus, in this operation example, in the case where four or more reception satellites from which both the L1 observation data and the L2 observation data are obtained exist, the ionospheric free pseudoranges for the four or more reception satellites are obtained and these are set to be used in the positioning calculation. Hereinafter, this operation example is explained in detail.

As shown in FIG. 9, at Step S71, the pseudorange processor 4 checks if both the L1 observation data and the L2 observation are obtained by the acquisition/tracking unit 2, for each reception satellite. Next, in a case where the four or more reception satellites from which both the L1 observation data and the L2 observation data are obtained exist at Step S72, the pseudorange processor 4 executes Step S73, and in a case where the reception satellites from which both of the observation data are obtained are less than four, the pseudorange processor 4 executes Step S75.

At Step S73, for each reception satellite from which both the L1 observation data and the L2 observation data are obtained, the pseudorange processor 4 performs carrier smoothing for the pseudorange contained in the L1 observation data by using the ADR contained in the L1 observation data, and performs carrier smoothing for the pseudorange contained in the L2 observation data by using the ADR contained in the L2 observation data as well. Thereby, for each reception satellite from which both the L1 observation data and the L2 observation data are obtained, the corrected L1 pseudorange and the corrected L2 pseudorange are obtained.

Then, at Step S74, for each reception satellite from which both the L1 observation data and the L2 observation data are obtained, by having the corrected L1 pseudorange as r1 in Equation (1) and the corrected L2 pseudorange as r2 in Equation (2), the pseudorange processor 4 obtains the ionospheric free pseudorange rt. At Step S74, the ionospheric free pseudoranges for four or more satellites are obtained. These ionospheric free pseudoranges are inputted to the calculator 6 to be used in the positioning calculation. After the ionospheric free pseudoranges for the four or more satellites are inputted from the pseudorange processor 4, the calculator 6 uses them and performs the positioning calculation.

Meanwhile, at Step S75, the pseudorange processor 4 performs carrier smoothing to the pseudorange or pseudoranges contained in the obtained observation data, for each reception satellite. For example, for a single reception satellite, in the case where only one of the L1 observation data and the L2 observation data is obtained by the acquisition/tracking unit 2, the pseudorange processor 4 uses the ADR contained in the observation data and performs carrier smoothing on the pseudorange contained in the observation data. Further, for a single reception satellite, in the case where both the L1 observation data and the L2 observation data are obtained by the acquisition/tracking unit 2, for the pseudorange contained in the L1 observation data, the pseudorange processor 4 uses the ADR contained in the L1 observation data and performs carrier smoothing, and for the pseudorange contained in the L2 observation data, the pseudorange processor 4 uses the ADR contained in the L2 observation data and performs carrier smoothing. Thereby, at Step S75, at least one of the corrected L1 pseudorange and the corrected L2 pseudorange is obtained, for each reception satellite.

Then, at Step S76, the pseudorange processor 4 selects one of the corrected L1 pseudorange and the corrected L2 pseudorange to be used in the positioning calculation, for each reception satellite. For example, for a single reception satellite, in the case where only one of the corrected L1 pseudorange and the corrected L2 pseudorange is obtained, the pseudorange of the obtained pseudorange is set to be used. Further, for a single reception satellite, in the case where both the corrected L1 pseudorange and the corrected L2 pseudorange are obtained, similar to Step S55 in the second operation example described above, the pseudorange to be used is selected from the corrected L1 pseudorange and the corrected L2 pseudorange based on the predetermined condition. Further, the pseudorange processor 4 outputs the to-be-used pseudorange to the calculator 6. Here, the pseudorange to be inputted to the calculator 6 is the pseudorange with the influence of the ionospheric delay.

After the pseudoranges with the influence of the ionospheric delay for four or more satellites are inputted to the calculator 6 from the pseudorange processor 4, as described above, the calculator 6 uses the ionospheric parameter and obtains the ionospheric delay amount. Further, the calculator 6 corrects each of the pseudoranges inputted from the pseudorange processor 4 by using the obtained ionospheric delay amount and removes influence of the ionospheric delay from each pseudorange. Then, the calculator 6 performs the positioning calculation by using each corrected pseudorange.

For each reception satellite, the pseudorange processor 4 performs the above processing from Steps S71 to S76 repeatedly with a predetermined time interval.

As above, in this operation example, in the case where the number of the reception satellites from which the L1 observation and the L2 observation data are obtained is less than four, because the pseudorange processor 4 performs the similar operation as the above second operation example, the similar effects as the second operation example can be obtained.

Further, in this operation example, in the case where the number of the reception satellites from which the L1 observation and the L2 observation data are obtained is four or more, because the ionospheric free pseudoranges are set to be used in positioning calculation, the position accuracy and the time accuracy improve.

Note that, in the case where the number of the reception satellites from which the L1 observation and the L2 observation data are obtained is less than four, as in the above third operation example, if only one of the L1 observation data and the L2 observation data is obtained regarding each reception satellite, the pseudorange of the obtained observation data may be set to be used, and if the L1 observation data and the L2 observation data are obtained, the weighted average value of the pseudoranges thereof is obtained and the obtained weighted average value may be set as the pseudorange to be used. Thereby, the similar effects as the third operation example can be obtained.

Alternatively, as the observation data, only the pseudorange may be obtained by the acquisition/tracking unit 2. In this case, Step S73 is not executed, and ionospheric free pseudorange obtained by using the pseudorange that is not performed with the carrier smoothing is inputted to the calculator 6. Moreover, Step S75 is not executed, and the pseudorange that is not performed with the carrier smoothing is inputted to the calculator 6.

Further, in a case where a plurality of kinds of signals that are three kinds or more where carrier frequencies are different from each other are transmitted from each reception satellite, similarly, the pseudorange to be used by the calculator 6 can be obtained. That is, if the number of the reception satellites from which the plurality of observation data is obtained is less than four, the model corrected pseudorange is set to be the pseudorange to be used by the calculator 6, and if the number of the reception satellites from which the plurality of observation data is obtained is four or more, the ionospheric free pseudorange is set to be the pseudorange to be used by the calculator 6.

In the embodiment explained as above is explained in a case where the present invention is applied to a GPS receiver; however, the present invention may be applied to other receivers of GNSS such as GALILEO and GLONASS. For example, in GALILEO, because two kinds of navigation messages: I/NAV message and F/NAV message, are used, similar to this embodiment, among a plurality of same kind of information that are contained in the two kinds of navigation messages, respectively, the kind of information to be used can be determined.

Further, the present invention may similarly be applied to information other than an ephemeris, an almanac, an ionospheric parameter, and an UTC parameter that are contained in a navigation message.

DESCRIPTION OF NUMERALS

1: Receiver
3: Navigation Message Acquiring Unit
5: Navigation Message Processor
6: Calculator
100: GNSS receiver

What is claimed is:

1. A GNSS receiver for receiving at least two kinds of signals transmitted from a GNSS satellite, the GNSS receiver comprising:
   a receiver for receiving signals transmitted from a plurality of GNSS satellites, each GNSS satellite transmitting a first navigation message superimposed on a first carrier frequency and a second navigation message superimposed on a second carrier frequency different from the first carrier frequency, the first and second navigation messages including the same kind of information;
   a first navigation message acquiring unit for acquiring predetermined information from the first navigation messages contained in the received signals from the plurality of GNSS satellites;
   a second navigation message acquiring unit for acquiring predetermined information from the second navigation messages contained in the received signals from the plurality of GNSS satellites;
   a navigation message processor for outputting either the predetermined information acquired from the first navigation message or the predetermined information acquired from the second navigation message, where the predetermined information includes the same kind of information contained in the different navigation messages, which is acquired by the navigation message acquiring unit; and
   a calculator for performing a calculation based on the outputted information.

2. The GNSS receiver of claim 1, wherein the navigation message processor outputs either the predetermined information acquired first, the latest acquired predetermined information, the most accurate predetermined information, or the most reliable predetermined information.

3. The GNSS receiver of claim 1, wherein the navigation message processor outputs the predetermined information designated by a user.

4. The GNSS receiver of claim 1, wherein the first and second navigation messages are a NAV message and a CNAV message, respectively, and the navigation message processor outputs the predetermined information contained in the CNAV message.

5. The GNSS receiver of claim 1, wherein the predetermined information is one of an ephemeris, an almanac, an ionospheric parameter, and a UTC parameter.

6. The GNSS receiver of claim 2, wherein the predetermined information is one of an ephemeris, an almanac, an ionospheric parameter, and a UTC parameter.

7. The GNSS receiver of claim 1, wherein the predetermined information is one of an ephemeris, an almanac, an ionospheric parameter, and a UTC parameter.

8. The GNSS receiver of claim 3, wherein the predetermined information is one of an ephemeris, an almanac, an ionospheric parameter, and a UTC parameter.

9. The GNSS receiver of claim 4, wherein the predetermined information is either one of an ephemeris, an almanac, an ionospheric parameter, and a UTC parameter.

* * * * *